United States Patent [19]

Suter

[11] 3,731,525

[45] May 8, 1973

[54] PRESSURE TESTING APPARATUS

[75] Inventor: Walter Suter, Willoughby Hills, Ohio

[73] Assignee: United States Steel Corporation, Pittsburgh, Pa.

[22] Filed: May 13, 1971

[21] Appl. No.: 142,868

[52] U.S. Cl. ................................................73/49.5
[51] Int. Cl. ...............................................G01m 3/28
[58] Field of Search..............................73/49.1, 49.5

[56] References Cited

UNITED STATES PATENTS

| | | | |
|---|---|---|---|
| 1,734,805 | 11/1929 | Hawthorne | 73/49.5 |
| 3,606,913 | 9/1971 | Yie | 73/49.1 X |
| 3,034,339 | 5/1962 | Gawlik | 73/49.5 X |
| 3,179,127 | 4/1965 | Terry | 73/49.1 |

FOREIGN PATENTS OR APPLICATIONS

| | | | |
|---|---|---|---|
| 1,220,171 | 6/1966 | Germany | 73/49.1 |
| 116,565 | 4/1969 | Norway | 73/49.5 |

*Primary Examiner*—Louis R. Prince
*Assistant Examiner*—Joseph W. Roskos
*Attorney*—Robert J. Leek, Jr.

[57] ABSTRACT

Apparatus for pressure testing a hollow body at a predetermined testing pressure for areas of weakness is disclosed. The apparatus has frame and a core member mounted on the frame. The hollow body is disposed either about or within the core member. A first sealing member and a second sealing member are mounted on one member of the core member and the hollow body between the core member and the hollow body and define, when pressurized to a predetermined sealing pressure, with the core member and the hollow body a test volume for a test area in the hollow body to be tested for areas of weakness. A first pressurizing means inflates the first sealing member and the second sealing member to the predetermined sealing pressure and a second pressurizing means pressurizes the test volume to the predetermined testing pressure.

14 Claims, 10 Drawing Figures

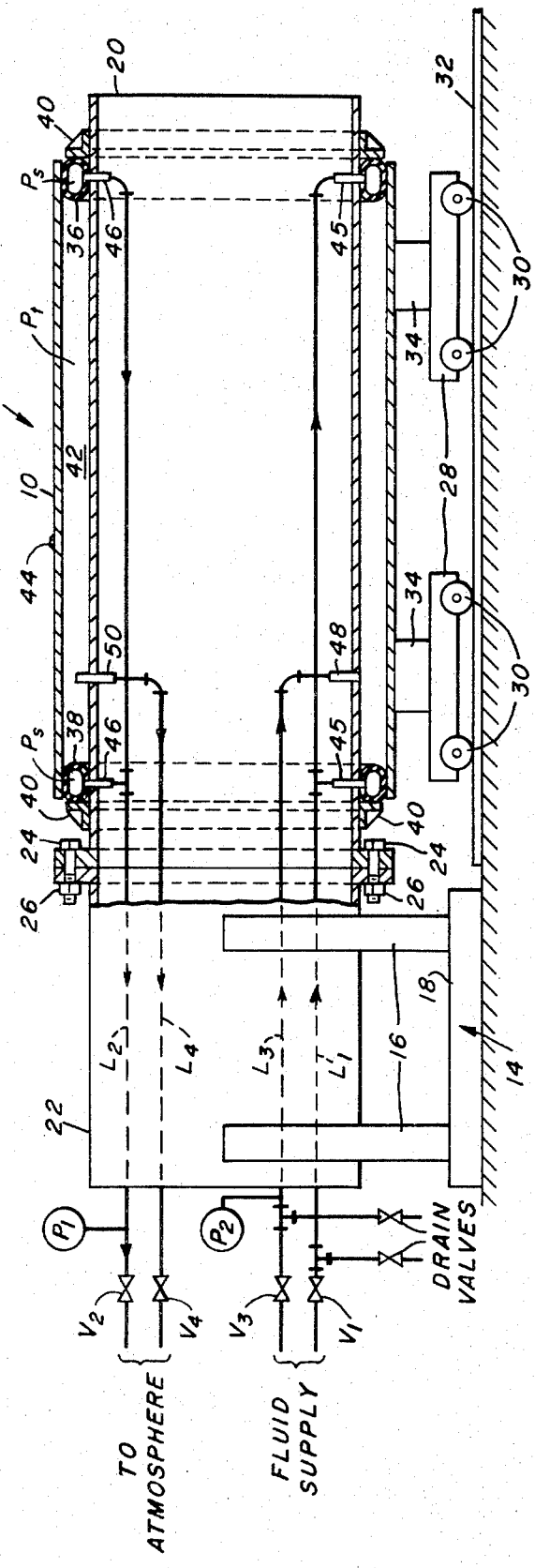
FIG. 1.
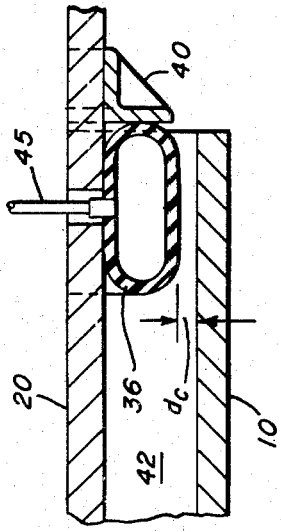
FIG. 2A.
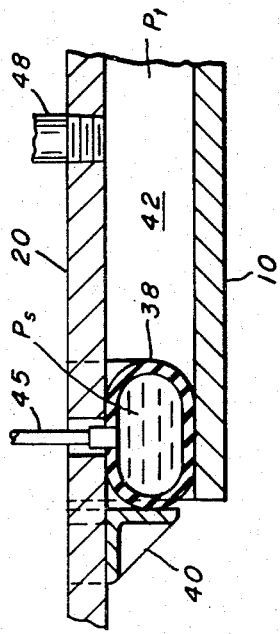
FIG. 2B.
INVENTOR.
WALTER SUTER
By
Attorney

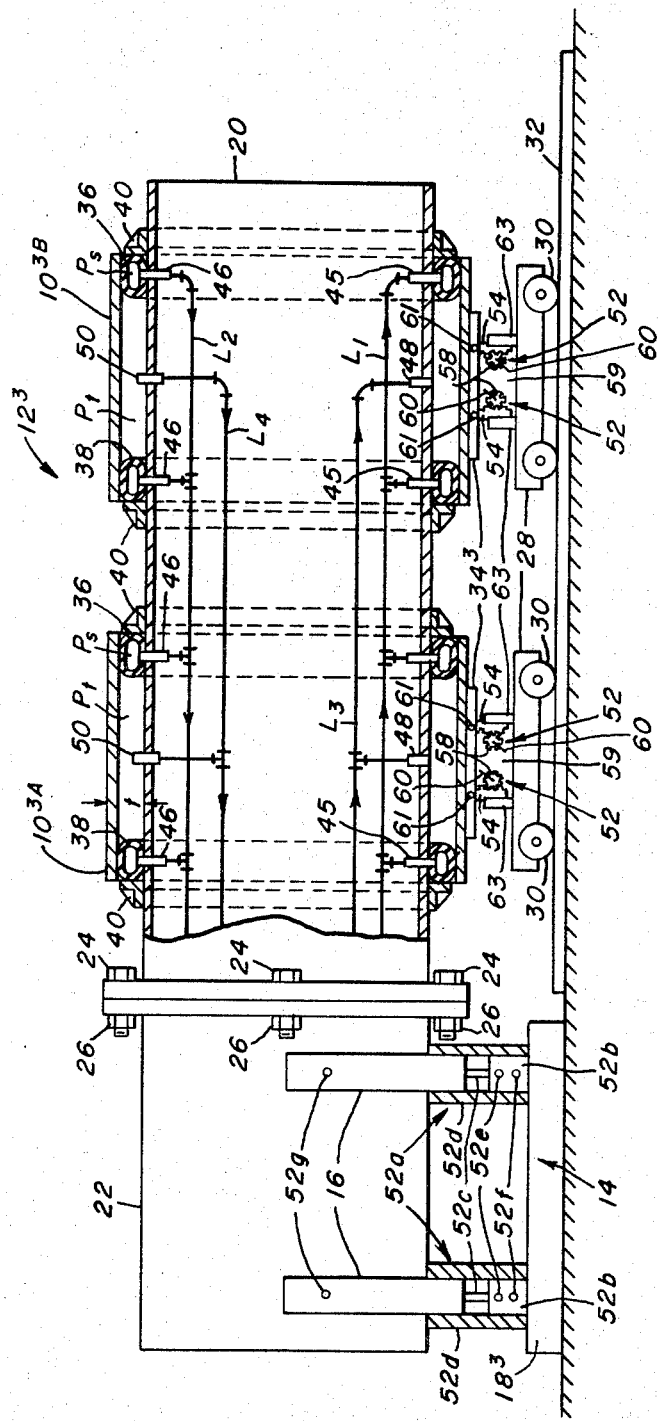

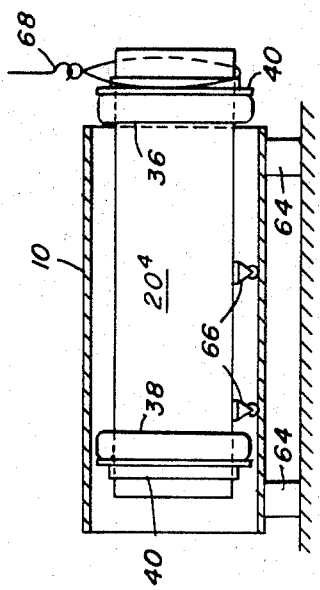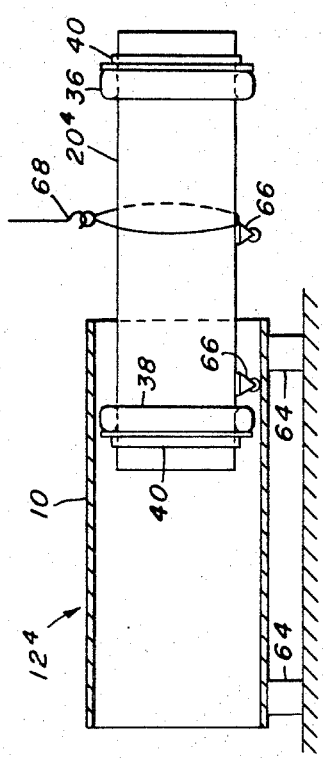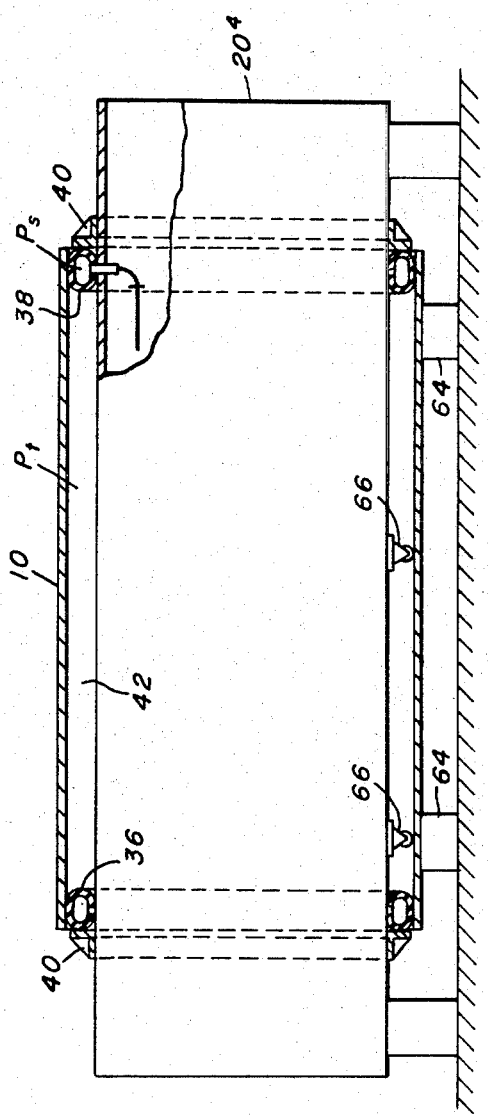

DRAIN VALVES

INVENTOR.
WALTER SUTER
By
Attorney

PRESSURE TESTING APPARATUS

BACKGROUND OF THE INVENTION

Heretofore, conventional pressure testing apparatus, usually called hydrotesters for the pressure testing of hollow bodies, such as welded pipes or the like, used solid member seal rings, usually of round, square, rectangular or the like cross section, to provide a water-tight seal between the core member and the pipe to be tested. Such conventional pressure testing apparatus is expensive to fabricate and to operate, requires a massive head to close off each end of the pipe to be tested; requires precise machining of each head adjacent the area where a solid sealing ring contacts the head, requires a heavy movable car having a traversing mechanism, one of which movable heads must be traversed to permit the loading of the pipe into or onto the core of the pressure testing apparatus, requires massive locking devices to lock the movable head to the end of the pipe and to the core of the testing apparatus, requires considerable manual labor to properly position each solid sealing ring between the pipe and the movable head of the core member to provide a water-tight seal and requires that the ends of the pipe be parallel or square to the movable heads of the pressure testing apparatus.

Conventional devices are shown in the following U.S. Patents:

| U. S. Pat. No. | Inventor | Issued |
| --- | --- | --- |
| 2,953,919 | Potts | 9/27/60 |
| 2,955,458 | Sonnier et al. | 10/11/60 |
| 2,957,336 | Koehler et al. | 10/25/60 |
| 3,018,657 | Yevick | 1/30/62 |

OBJECTS OF THE INVENTION

It is the general object of this invention to avoid and overcome the foregoing and other difficulties of and objections to prior art practices by the provision of an improved apparatus for the pressure testing of a hollow body at a predetermined testing pressure for areas of weakness which apparatus:

a. is inexpensive to fabricate and to operate;
b. eliminates the conventional massive movable heads normally required to close off each end of the pipe being tested;
c. eliminates the precise machining of each movable head in the area where the seal ring contacts such movable head;
d. eliminates the heavy conventional car and traversing mechanism normally required to load the pipe into or onto the core of the test apparatus;
e. eliminates the massive conventional locking devices normally required to lock the movable head to the end of the pipe and to the core member of the testing apparatus;
f. eliminates the manual labor required to position the conventional solid seal between the pipe and the movable head to assure a water-tight seal; and
g. eliminates the need that the ends of the pipe being tested be parallel or square to the movable head of the testing apparatus.

BRIEF SUMMARY OF THE INVENTION

The aforesaid objects of this invention and other objects which will become apparent as the description proceeds are achieved by providing an improved apparatus for pressure testing a hollow body for areas of weakness at a predetermined testing pressure. The apparatus has a frame and a core member mounted on the frame. The hollow body is disposed either about or within the core member. A first sealing member and a second sealing member are mounted on one member of the core member and the hollow body between the core member and the hollow body and define, when pressurized to a predetermined sealing pressure, with the core member and the hollow body a test volume for a test area in the hollow body to be tested for areas of weakness. A first pressurizing means inflates the first sealing member and the second sealing member to the predetermined sealing pressure and a second pressurizing means pressurizes the test volume to the predetermined testing pressure.

BRIEF DESCRIPTION OF THE SEVERAL VIEWS OF THE DRAWINGS

For a better understanding of this invention reference should be had to the accompanying drawings wherein like numerals of reference indicate similar parts throughout the several views and wherein:

FIG. 1 is a side elevational view partially in section of the improved apparatus for pressure testing a hollow body, such as a pipe or the like, for areas of weakness at a predetermined test pressure and showing the pipe disposed about a core member of the testing apparatus;

FIG. 2A is an enlarged fragmentary vertical sectional view showing the lower portion of the sealing member on the right side of FIG. 1 in the deflated position and the pipe within the core member, FIG. 2B is a view similar to FIG. 2A showing the lower portion of the sealing member on the left side of FIG. 1 in the inflated pressurized position;

FIG. 3 is a view similar to FIG. 1 of an alternative embodiment of the apparatus and showing the testing of a plural number of pipes simultaneously;

FIG. 4A is a diagrammatic side elevational view of a further alternative embodiment of the apparatus and showing the pipe core being positioned by means of wheels on the pipe core which ride on the inner surfaces of the pipe and a hoist about the pipe to be tested;

FIG. 4B is a view similar to FIG. 4A showing the core member positioned within the pipe preparatory for the test operation;

FIG. 4C is an enlarged view similar to FIGS. 4A and 4B showing the first sealing member and the second sealing member in the pressurized condition and the test volume pressurized to the predetermined test pressure;

Figure 5:
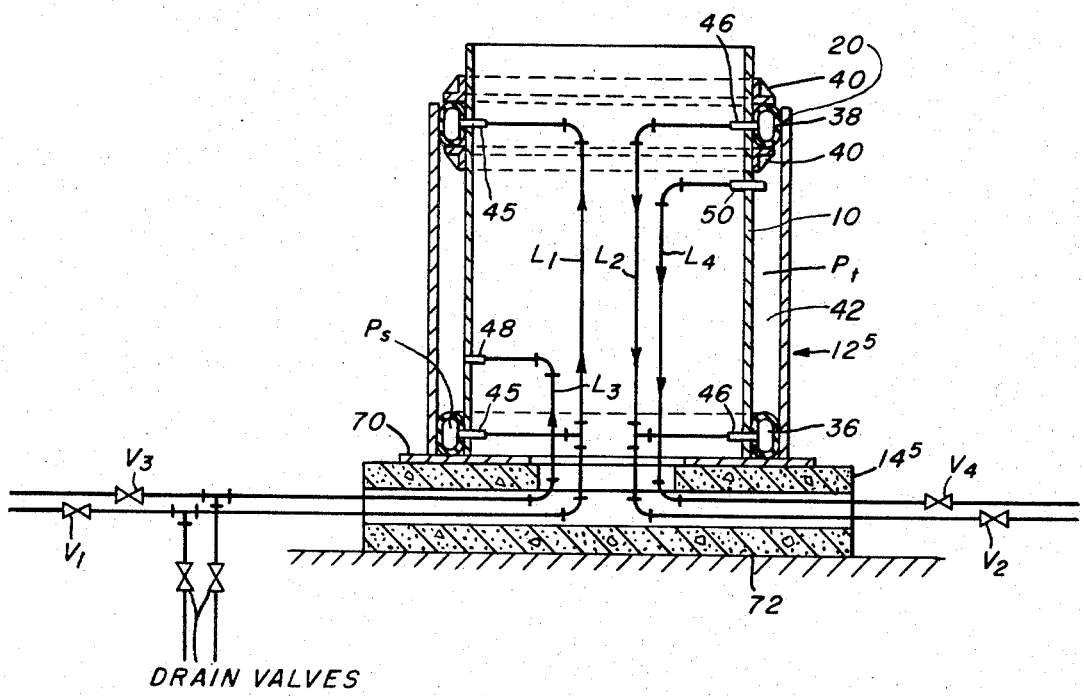
FIG. 5 is a vertical sectional view of a further alternative embodiment of the apparatus and showing the pipe disposed within the core member and both members disposed in the vertical position.

Although the principles of this invention are broadly applicable to the pressure testing of hollow bodies, this invention is particularly adapted for and in conjunction with the testing of hollow steel pipe or the like and hence it has been so illustrated and will be so described.

DETAILED DESCRIPTION

With specific reference to the form of this invention illustrated in the drawings and referring particularly to FIGS. 1, 2A, 2B, apparatus for the pressure testing of a hollow body, such as a pipe 10 (FIGS. 1, 2A, 2B) or the like at a predetermined test pressure for areas of weakness is indicated generally by the reference numeral 12 (FIG. 1).

The apparatus 12 has a frame or pipe core support 14 (FIG. 1) having legs 16 (FIG. 1) upstanding from a bed plate 18 (FIG. 1). A core member 20 (FIGS. 1, 2A, 2B) is mounted on the frame 14 by means of a coupling 22 (FIG. 1) and bolts 24 (FIG. 1) and nuts 26 (FIG. 1).

For the purpose of positioning the hollow body or pipe 10 with respect to the core member 20, a movable member such as carriages 28 (FIG. 1) ride by means of wheels 30 (FIG. 1) on tracks 32 (FIG. 1) and are provided with saddle members 34 (FIG. 1) for carrying the pipe 10.

A first sealing member 36 (FIGS. 1, 2A) and a second sealing member 38 (FIGS. 1, 2B) are mounted on one member of the core member 20 and the pipe 10 (in the case of FIGS. 1,2 on the core member 20) and retained thereon by a retaining member 40 (FIGS. 1, 2A, 2B), such as angles or the like, between the core member 20 and the pipe 10. The sealing members 36,38 define with tee core member 20 and pipe 10 a test volume 42 (FIGS. 1, 2B), having a possible area of weakness, such as the weld 44 (FIG. 1) on the pipes 20, when the sealing members 36, 38 are pressurized (FIGS. 1, 2B) to a predetermined sealing pressure $P_s$.

A first pressurizing means for pressurizing the sealing members to the predetermined sealing pressure $P_s$ has a fill line $L_1$ (FIG. 1) extending from a suitable source of fluid pressure (indicated by the legend "Fluid Supply") such as water, air or the like, through a valve $V_1$ and inlets 45 (FIGS. 1, 2A, 2B) to the sealing members 36, 38. A return line $L_2$ (FIG. 1) extends from outlets 46 (FIG. 1) from sealing members 36, 38 through valve $V_2$ (FIG. 1) and measuring means, such as pressure gage $P_1$ or the like, to the atmosphere. After the sealing members 36, 38 are bled free of entrapped air and when valve $V_2$ is closed, the sealing members 36, 38 are filled to the predetermined sealing pressure $P_s$, as indicated by gage $P_1$ to hermetically seal the test volume 42.

A second pressurizing means for pressurizing the test volume 42 to the predetermined test pressure $P_t$, as indicated by the measuring means, such as gage $P_2$ disposed, (for example) in the wall of the core member 20, has a fill line $L_3$ (FIG. 1) extending from the fluid supply through valve $V_3$ and inlet 48 (FIGS. 1, 2B) to the test volume 42. A bleedoff line $L_4$ connects outlet 50 (FIG. 1) for test volume 42 through valve $V_4$ to the atmosphere. In like manner, when the trapped air is bled off and valve $V_4$ is closed, the test volume 42 is filled to the predetermined test pressure $P_t$ through line $L_3$ and inlets 48.

If, for example, a leak develops in the area of weakness adjacent weld 44 (FIG. 1) the pressure will drop in the test volume 42 (as shown on gage $P_2$) and such leak may be marked by the test operator.

The sealing members 36, 38 have a generally flat ovular or elliptical shape, when deflated (FIG. 2A), and are adapted to pass with clearance $d_c$ (FIG. 2A) between the pipe 10 and the core member 20. Such sealing members 36, 38 are formed from a flexible material such as rubber, polyvinyl chloride, polyurethane elastomers of the type disclosed in U.S. Pat. No. 2,729,618 issued Jan. 3, 1956 to Muller et al., polybutadiene, silicon rubbers and the like and may be reinforced with fibers or cords of cotton, nylon, steel or the like.

ALTERNATIVE EMBODIMENTS

It will be understood by those skilled in the art that alternatively, as shown in FIG. 3, the apparatus $12^3$ may e utilized to simultaneously test pipes 10 $^{3A}$and 10 $^{3B}$ which pipes $10^{3A}$, $10^{3B}$ of course each utilize a pair of sealing members 36 and 38. In addition, as shown in FIG. 3, saddle member $34^3$ associated with the carriages 28 may be positionable by means of positioning mechanisms 52 which positioning mechanisms 52 may consist of opposed movable racks 54 depending from the saddle member $34^3$ and a gear 58 rotatable (on stationary portion 59 upstanding from carriages 28) with respect to the stationary rack 54 by means of a handle 60 on the gear 58 of the saddle member $34^3$. The positioning mechanisms 52 are utilized to provide a uniform space $t$, if desired, between the pipes $10^{3A}$, $10^{3B}$ and the core member 20. The racks 54 are pivotable at 61 on the saddle member $34^3$ and reciprocate in guides 63.

Alternatively the uniform space t may be maintained, if desired, by positioning mechanisms 52a (FIG. 3) associated with the coupling 22. Each positioning mechanism 52a has a fluid cylinder 52b whose piston 52c moves the associated leg 16 in a guide 52d as required. Each cylinder 52b has a fluid inlet 52e and a fluid outlet 52f. The legs 16 are pivotable at 52g on the coupling 22.

In FIGS. 4A–4C the pipe 10 is stationarily mounted on removable supports 64. The core member $20^4$ carries the sealing members 36 and 38, is provided with casters or wheels 66, and is carried by a movable member such as a hoist or chain 68 (FIGS. 4A, 4B). Such hoist 68 moves the core member $20^4$ from the position shown in FIG. 4A into the position shown in FIGS. 4B and 4C where, as in the prior embodiment, the sealing members 36 and 38 are inflated to a pressure Ps and the test volume 42 is pressurized to the predetermined test pressure $P_t$.

In FIG. 5, the core member 20 and the pipe 10 are vertically disposed on the support frame $14^5$ comprising, for example, a metallic bed plate 70 and a generally hollow support member 72.

Figure 6:
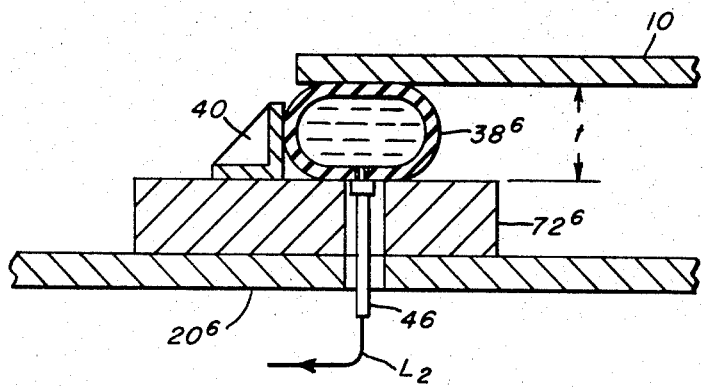
FIG. 6 is an enlarged fragmentary vertical sectional view of an alternative embodiment of the core member of the apparatus and showing such core member provided with a fixed support between the core member and the pipe.

In FIG. 6, the sealing members 36 and 38 as evidenced by the showing of the sealing member $38^6$, substantially fill the clearance space t, when such sealing member $38^6$ is in the deflated position. The outlet 46 from the sealing member $38^6$ extends outwardly through a support member $72^6$ of the core member $20^6$ to the inside of the core member $20^6$.

Figure 7:
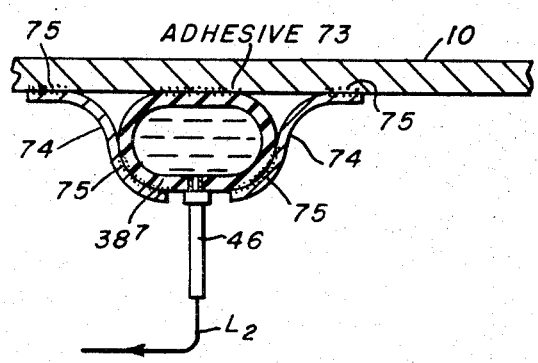
FIG. 7 is a fragmentary vertical sectional view showing one of the sealing members carried by the hollow body or pipe.

FIG. 7 shows one of the sealing members, in this case the sealing member 38⁷, secured by means of an adhesive 73 along its top wall to the pipe 10 or alternatively retained on the pipe 10 by means of resilient metallic, plastic or the like supports 74 secured thereto, as by welding, adhesive or the like 75.

The adhesives 73, 75, may be any of the following or the like:

| Trade Mark or Trade Name | Manufacturer |
|---|---|
| "Surlyn" A ionomer resin | E. I. duPont de Nemours & Co. |
| "Bakelite" phenoxy resins PKHH and PAHJ | Union Carbide Corp. |
| "Scotch-Held" brand structural adhesives | 3M Company |
| A-1103-B adhesive | B. F. Goodrich Industrial Products Company |
| USS "Nexus" PQE-1 polymeric material | United States Steel Corp. |
| "CYBOND" polyurethane adhesive | American Cyanamid Laboratories |

SUMMARY OF THE ACHIEVEMENTS OF THE OBJECTS OF THE INVENTION

It will be recognized by those skilled in the art that the objects of this invention have been achieved by providing an improved apparatus 12 (FIGS. 1, 2A, 2B), 12³ (FIG. 3), 12⁴ (FIGS. 4A–4C), and 12⁵ (FIG. 5) for testing a hollow body, such as a pipe 10 or the like, for an area of weakness, such as a weld 44 (FIG. 1) or the like at a predetermined testing pressure $P_t$, which apparatus is inexpensive to fabricate and to operate, eliminates the conventional massive movable heads normally required to seal off each end of the pipe 10 being tested, eliminates the precise machining of each movable head in the area where the conventional sealing ring contacts such movable head, eliminates the heavy conventional car and associated traversing mechanism normally required to load the pipe into or onto the core of the test apparatus, eliminates the massive conventional locking device normally required to lock the movable head to the end of the pipe 10 and to the core member of the testing apparatus, eliminates the manual labor required to position the conventional solid seal between the pipe 10 and the movable head to assure a water-tight or fluid-tight seal and eliminates the necessity of machining the ends of the pipe 10 parallel or square to the movable head of the testing apparatus.

While in accordance with the patent statutes, preferred and alternative embodiments of this invention have been illustrated and described in detail, it is to be particularly understood that the invention is not limited thereto or thereby.

I claim:

1. Apparatus for pressure testing a hollow body at a predetermined testing pressure for areas of weakness and having:
   a. a frame;
   b. a core member mounted on said frame;
   c. said hollow body being disposed either about or within said core member;
   d. a first sealing member and a second sealing member mounted on one member of said core member and said hollow body between said core member and said hollow body and defining, when pressurized to a predetermined sealing pressure, with said core member and said hollow body a test volume having a test area in said hollow body to be tested for areas of weakness;
   e. a first pressurizing means for inflating said first sealing member and said second sealing member to said predetermined sealing pressure;
   f. a second pressurizing means for pressurizing said test volume to said predetermined testing pressure;
   g. a movable member for supporting one of said core member and said hollow body; and
   h. positioning means connected to said movable member for moving said one of said core member and said movable member to provide a uniform width to said test volume.

2. The apparatus recited in claim 1 wherein said hollow body is within said core member.

3. The apparatus recited in claim 1 wherein said hollow body is about said core member.

4. The apparatus recited in claim 1 wherein said sealing members are on said core member.

5. The apparatus recited in claim 1 wherein said sealing members are on said hollow body.

6. The apparatus recited in claim 1 and having a retaining means on said one member for retaining said sealing members on said one member.

7. The apparatus recited in claim 6 wherein said retaining member is on said core member.

8. The apparatus recited in claim 6 wherein said retaining member is on said hollow body.

9. The apparatus recited in claim 1 wherein one of said sealing members has a generally flat deflated shape and is adapted when deflated to move with clearance between said core member and said hollow body.

10. The apparatus recited in claim 1 wherein one of said sealing members when inflated substantially fills the space between said core member and said hollow body.

11. The apparatus recited in claim 1 wherein: said movable member supports said hollow body.

12. The apparatus recited in claim 1 wherein: said movable member supports said core member.

13. The apparatus recited in claim 1 and having:
   a. said positioning mechanism having arms pivotably connected to said movable member in spaced relation; and
   b. operation means connected to each of said spaced arms for independent movement of each spaced arm.

14. The apparatus recited in claim 1 wherein: said positioning mechanism is a rack and pinion mechanism.

* * * * *